US009106892B2

United States Patent
Sun et al.

(10) Patent No.: US 9,106,892 B2
(45) Date of Patent: *Aug. 11, 2015

(54) IMAGE COMPRESSION BASED ON PARAMETER-ASSISTED INPAINTING

(71) Applicant: Microsoft Corporation, Redmond, WA (US)

(72) Inventors: Xiaoyan Sun, Beijing (CN); Zhiwei Xiong, Beijing (CN); Feng Wu, Beijing (CN); Shipeng Li, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,802

(22) Filed: Jul. 2, 2014

(65) Prior Publication Data

US 2014/0314316 A1 Oct. 23, 2014

Related U.S. Application Data

(63) Continuation of application No. 13/674,437, filed on Nov. 12, 2012, now Pat. No. 8,774,531, which is a continuation of application No. 11/558,755, filed on Nov. 10, 2006, now Pat. No. 8,311,347.

(51) Int. Cl.
*G06K 9/62* (2006.01)
*H04N 19/17* (2014.01)
(Continued)

(52) U.S. Cl.
CPC .......... *H04N 19/0026* (2013.01); *G06K 9/0008* (2013.01); *G06K 9/00744* (2013.01); *G06T 9/00* (2013.01); *H04N 19/134* (2013.01); *H04N 19/17* (2013.01)

(58) Field of Classification Search
USPC ......... 382/162, 164, 165, 166, 173, 224, 232, 382/233, 236, 254, 260–161, 266; 375/240.22, E7.081, E7.088, E7.193, 375/E7.209; 348/208.99, 234, 397, 438; 345/503, 531, 552, 555, 629; 358/448, 358/515, 518, 530

See application file for complete search history.

(56) References Cited

U.S. PATENT DOCUMENTS 5,467,413 A * 11/1995 Barrett ........................ 382/236
5,497,435 A * 3/1996 Berger ........................ 382/249

(Continued)

OTHER PUBLICATIONS

Rane et al., "Structure and Texture Filling-In of Missing Image Blocks in Wireless Transmission and Compression Applications," retrieved at <<http://ieeexplore.ieee.org/iel5/83/26951/01197835.pdf?isNumber=>>, IEEE Transactions on Image Processing, vol. 12, No. 3, Mar. 2003, pp. 296-303.

(Continued)

*Primary Examiner* — Amir Alavi
(74) *Attorney, Agent, or Firm* — Miia Sula; Dan Choi; Micky Minhas

(57) ABSTRACT

Systems and methods provide image compression based on parameter-assisted inpainting. In one implementation of an encoder, an image is partitioned into blocks and the blocks classified as smooth or unsmooth, based on the degree of visual edge content and chromatic variation in each block. Image content of the unsmooth blocks is compressed, while image content of the smooth blocks is summarized by parameters, but not compressed. The parameters, once obtained, may also be compressed. At a decoder, the compressed image content of the unsmooth blocks and the compressed parameters of the smooth blocks are each decompressed. Each smooth block is then reconstructed by inpainting, guided by the parameters in order to impart visual detail from the original image that cannot be implied from the image content of neighboring blocks that have been decoded.

20 Claims, 8 Drawing Sheets

(51) Int. Cl.
*G06K 9/00* (2006.01)
*G06T 9/00* (2006.01)
*H04N 19/134* (2014.01)

(56) References Cited

U.S. PATENT DOCUMENTS

| | | | |
|---|---|---|---|
| 5,835,237 A * | 11/1998 | Ebrahimi | 358/448 |
| 5,862,264 A * | 1/1999 | Ishikawa et al. | 382/249 |
| 6,611,608 B1 * | 8/2003 | Wu et al. | 382/100 |
| 6,697,107 B1 * | 2/2004 | Hamilton et al. | 348/234 |
| 6,940,511 B2 | 9/2005 | Akenine-Moller et al. | |
| 7,171,057 B1 | 1/2007 | Wilensky et al. | |
| 7,230,429 B1 | 6/2007 | Huang et al. | |
| 7,272,265 B2 | 9/2007 | Kouri et al. | |
| 7,283,140 B2 | 10/2007 | Zhou et al. | |
| 7,346,224 B2 | 3/2008 | Kong et al. | |
| 7,477,800 B2 | 1/2009 | Avidan et al. | |
| 7,548,659 B2 | 6/2009 | Ofek et al. | |
| 8,311,347 B2 | 11/2012 | Sun et al. | |
| 8,422,546 B2 | 4/2013 | Lin et al. | |
| 8,774,531 B2 * | 7/2014 | Sun et al. | 382/224 |
| 2004/0008901 A1 | 1/2004 | Avinash | |
| 2005/0100235 A1 | 5/2005 | Kong et al. | |
| 2006/0067583 A1 | 3/2006 | Mushano | |
| 2006/0233455 A1 | 10/2006 | Cheng et al. | |
| 2008/0112626 A1 | 5/2008 | Sun et al. | |
| 2008/0238942 A1 | 10/2008 | Sun et al. | |
| 2012/0201475 A1 | 8/2012 | Carmel et al. | |
| 2014/0037204 A1 | 2/2014 | Sun et al. | |

OTHER PUBLICATIONS

Shen et al., "Review of Postprocessing Techniques for Compression Artifact Removal," retrieved at <<http://viola.usc.edu/newextra/Publication/PDF/selected/1998_JVCIR_Shen.pdf>>, Academic Press, Journal of Visual Communication and Image Representation, vol. 9, No. 1, 1998, pp. 2-14.

Yilmaz et al., "Robust Video Transmission Using Data Hiding," retrieved at <<http://193.226.6.174/COST276_3/pdf/paper30.pdf>>, Middle East Technical University, Ankara, Turkey, 6 pages.

* cited by examiner

~ INTERPOLATION IN THE BLOCK BEING SYNTHESIZED ~
(A) FOUR BORDERS ATTAINABLE; (B) THREE BORDERS ATTAINABLE; (C) TWO BORDERS ATTAINABLE (CASE ONE);
(D) TWO BORDERS ATTAINABLE (CASE TWO) ; (E) ONE BORDER ATTAINABLE.

IMAGE COMPRESSION BASED ON PARAMETER-ASSISTED INPAINTING

RELATED APPLICATIONS

This application is a continuation of U.S. patent application Ser. No. 13/674,437, filed on Nov. 12, 2012, now U.S. Pat. 8,774,531 which is a continuation of U.S. patent application Ser. No. 11/558,755 (now U.S. Pat. No. 8,311,347), filed on Nov. 10, 2006, both of which are incorporated by reference in their entireties.

BACKGROUND

Great improvements continue to be made in conventional signal processing-based image compression techniques. Mainstream coding schemata use the statistical redundancy among pixels in pursuit of high coding efficiency. Current state-of-the-art JPEG2000 and MPEG-4 AVC/H.264 are two examples that greatly outperform the coding efficiency of previous generations. Perceptual quality, however, is largely ignored during conventional algorithm design. In addition, current developments also demonstrate that even small improvements are commonly accomplished at the expense of multiplying encoding complexity.

Recently, vision-related technologies have shown remarkable progress in interpretively synthesizing certain visual aspects of an image in order to provide good perceptual quality—instead of straining to achieve perfection of pixel-wise fidelity during generation of the image. For example, when presented with a small sample image of a texture, synthesis techniques are able to produce a large image that possesses perceptually similar texture.

To further enhance image compression techniques, what is needed is a way to combine artificial synthesis of some parts of an image with conventional coding principles in order to achieve improved image compression ratios and higher coding efficiency.

SUMMARY

Systems and methods provide image compression based on parameter-assisted inpainting. In one implementation of an encoder, an image is partitioned into blocks and the blocks classified as smooth or unsmooth, based on the degree of visual edge content and chromatic variation in each block. Image content of the unsmooth blocks is compressed, while image content of the smooth blocks is summarized by parameters, but not compressed. The parameters, once obtained, may also be compressed. At a decoder, the compressed image content of the unsmooth blocks and the compressed parameters of the smooth blocks are each decompressed. Each smooth block is then reconstructed by inpainting, guided by the parameters in order to impart visual detail from the original image that cannot be implied from the image content of neighboring blocks that have been decoded.

This summary is provided to introduce exemplary image compression based on parameter-assisted inpainting, which is further described below in the Detailed Description. This summary is not intended to identify essential features of the claimed subject matter, nor is it intended for use in determining the scope of the claimed subject matter.

DETAILED DESCRIPTION

Overview

Described herein are systems and methods for image compression based on parameter-assisted inpainting. Such systems and methods significantly boost image (and video) compression and coding efficiency. In a typical implementation, an image is partitioned into blocks. Blocks that pass a smoothness test are skipped at a compression stage. Instead of compression, luminance and chrominance variations in the skipped blocks as well as the direction of trends in these variations are summarized with parameters that have a small data size. These parameters may then be compressed—in lieu of the image content—to represent the skipped blocks.

At the decoder, the skipped blocks are inpainted based on interpolated visual attributes of neighboring blocks, if any, that have image content that has been decompressed. The parameters gathered at the encoder on behalf of the skipped blocks guide the inpainting so that luminance and chrominance variations can be customized for each block being synthesized during inpainting, even though neighboring blocks may not possess the same variations. The overall result is a higher compression ratio than conventional techniques, especially for smooth regions of an image, yet still having a plausible perceptual fidelity to the original image.

Figure 1:
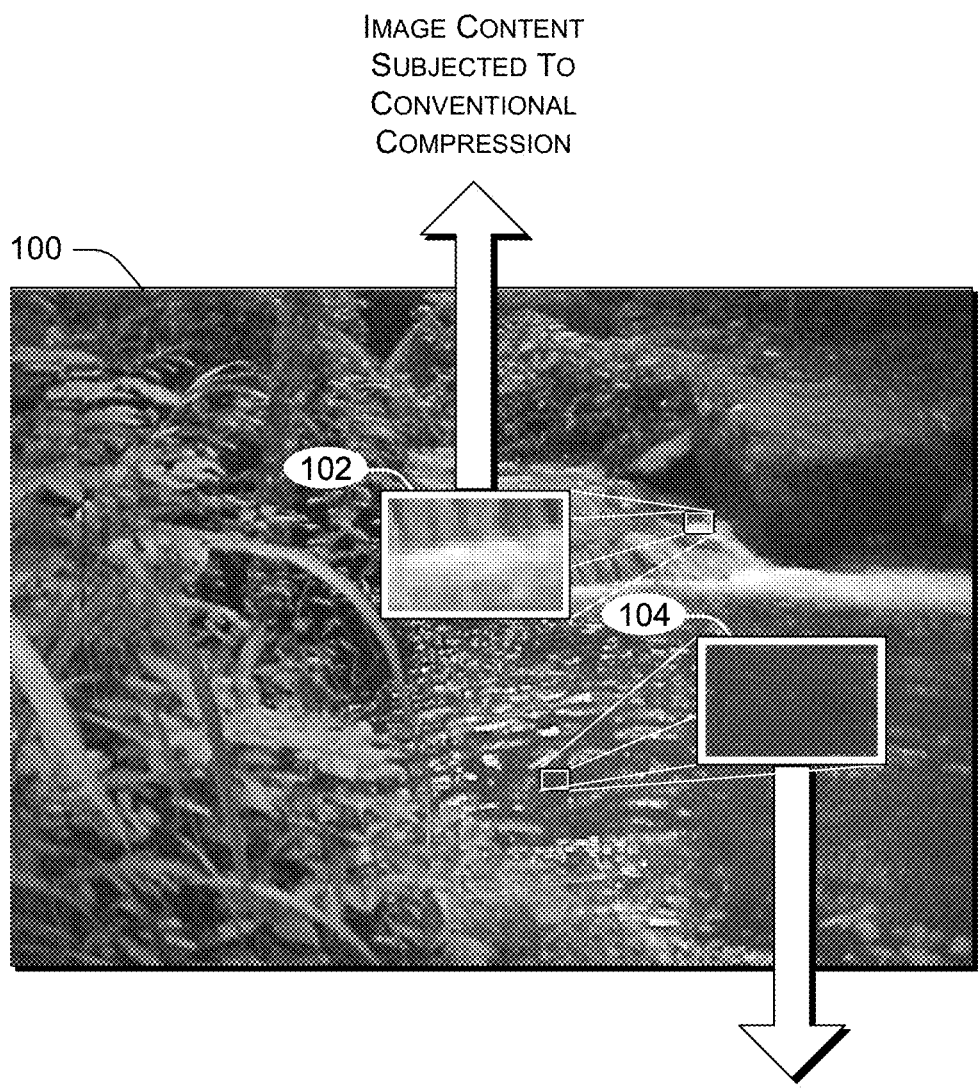
FIG. 1 is a diagram of exemplary classification of image blocks.

As shown in FIG. 1, an exemplary system for coding an image 100 distinguishes between regions of the image 100 to be subjected to conventional compression ("compressed regions" or "compressible regions" 102), and regions to be described or summarized by a few parameters instead of being subject to compression ("summarized regions," "skipped regions," or "synthesized regions" 104). The summarized, skipped regions 104, which are smooth and easy to describe, are then later reconstituted at a decoder via the inpainting or similar synthesis, with image content created at the decoder based at least in part on the parameters. These parameters are also referred to herein as "reconstruction parameters."

Although FIG. 1 shows a relatively large compressible region 102 to be subjected to compression and a relatively large skipped region 104 to be summarized via descriptive parameters instead of compressed, typical implementations distinguish these two types of regions on a smaller, block-by-block (e.g., macroblock) level.

In one implementation, the summarized regions 104 to be synthesized via parameters are reconstituted at the decoder by inpainting of a type similar to that which is used to propagate a texture from a small sample over a much larger area. The inpainting can be of such quality that the human visual system cannot easily distinguish a synthesized region 104, which has been reconstituted at the decoder via descriptive parameters, from the original version of the region. Thus, the exemplary system 200 aims to incorporate certain vision technologies, such as texture synthesis (assisted by descriptive parameters), into image compression with the goal of providing better perceptual quality over the pursuit of mere pixel-wise fidelity to an original image, while at the same time improving coding efficiency.

Exemplary System

Figure 2:
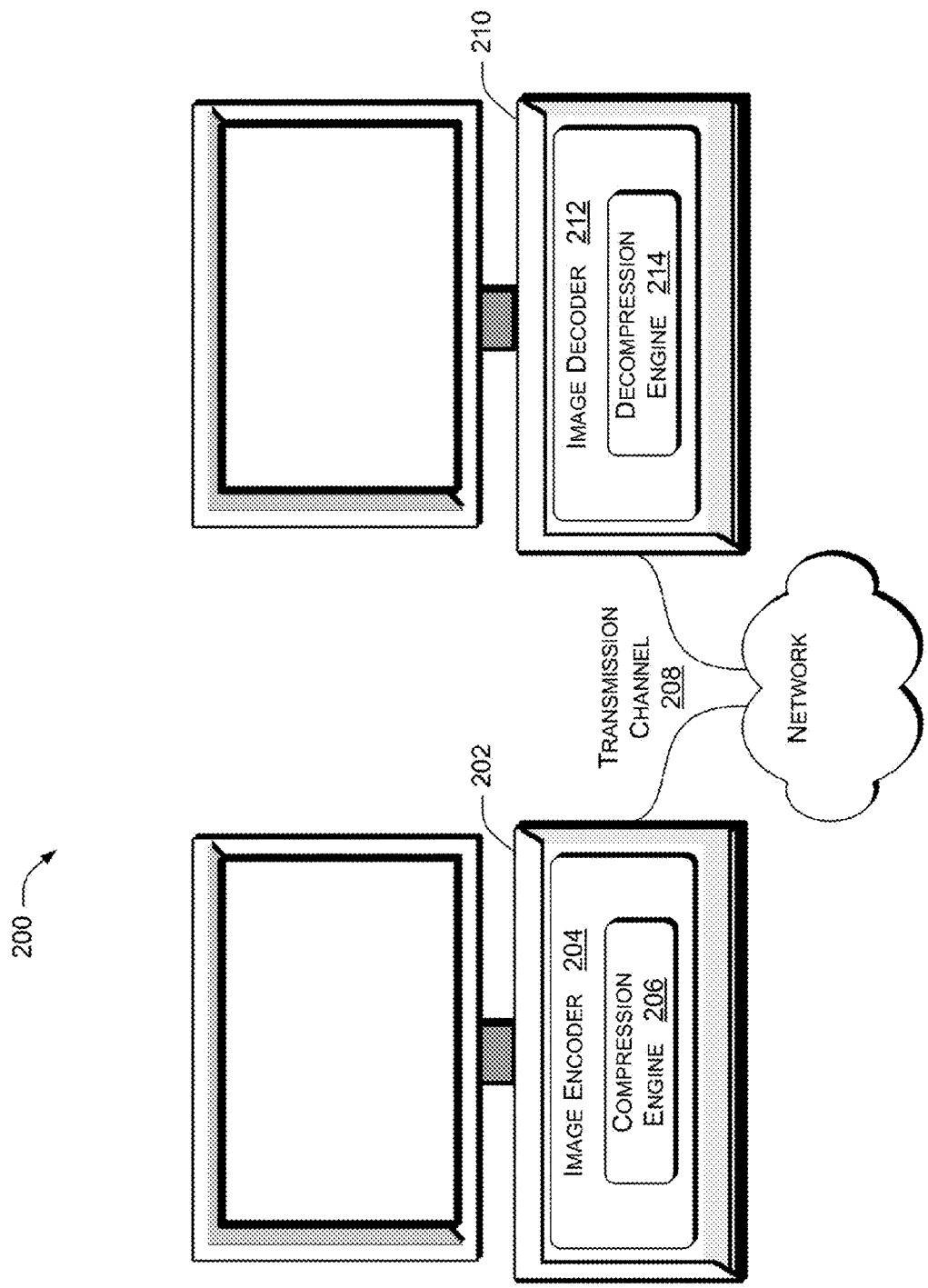
FIG. 2 is a block diagram of an exemplary system for image compression based on parameter-assisted inpainting.

FIG. 2 shows an exemplary system 200 for performing the exemplary image compression via parameter-assisted synthesis. A first computing device 202 hosts an image encoder 204 that includes an image compression engine 206. The first computing device 202 is coupled over a transmission channel 208, such as a network, to a second computing device 210. The second computing device 210 hosts an image decoder 212 that includes a decompression engine 214.

At the first computing device 202, the image encoder 204 and compression engine 206 encode an image 100 or a video. After transfer of the coded image over the transmission channel 208, the image is restored at the second computing device 210 by the image decoder 212 and decompression engine 214. It is worth noting that each computing device may have both the image encoder 204 and the image decoder 212 in order to send coded images back and forth between computing devices.

Figure 3:
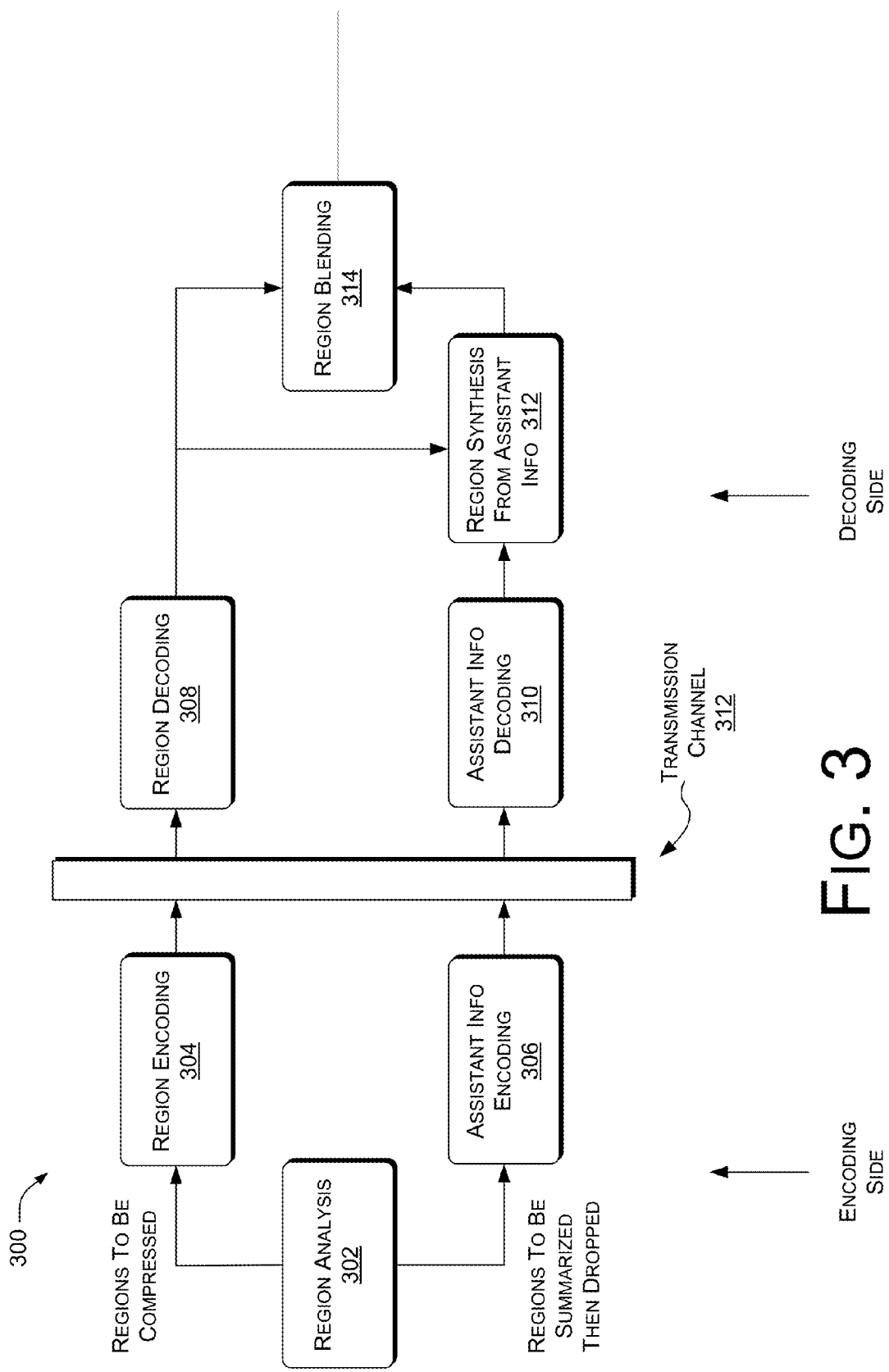
FIG. 3 is a diagram of exemplary process flow in the exemplary system of FIG. 2.

FIG. 3 shows an exemplary process flow 300 in the exemplary system 200. First, region analysis 302 separates regions to be compressed by conventional compression techniques from regions to be summarized by parameters but not compressed. Region encoding 304 compresses the regions that meet criteria for being compressed instead of summarized. Inversely, assistant information encoding 306 compresses the descriptive parameters of the regions that meet criteria for being summarized instead of compressed. The regions to be compressed 102 and the compressed parameters of the regions to be synthesized 104 are sent over the transmission channel 208 to a decoding side of the system 200.

On the decoding side of the transmission channel 208, region decoding 308 decompresses those regions that were compressed by conventional techniques on the encoding side. Assistant information decoding 310 decompresses the descriptive parameters of regions that were designated for summarization instead of compression on the encoding side. The descriptive parameters are then fed to region synthesis 312. In one implementation, region synthesis 312 creates regions by an inpainting technique guided by the decompressed parameters. The actual image content of the original regions being inpainted is not restored from a compressed state, rather the image content is created afresh by the inpainting technique based on metadata consisting of the descriptive parameters. For example, the descriptive parameters may inform the inpainter to produce a certain texture or certain variations in color for a region located at a particular position in the image.

At region blending 314, the regions from region decoding 308 that have been decompressed and the regions from region synthesis 312 that have been created from the parameters are now integrated with each other to become the reconstituted or decoded image.

Exemplary Engines

Figure 4:
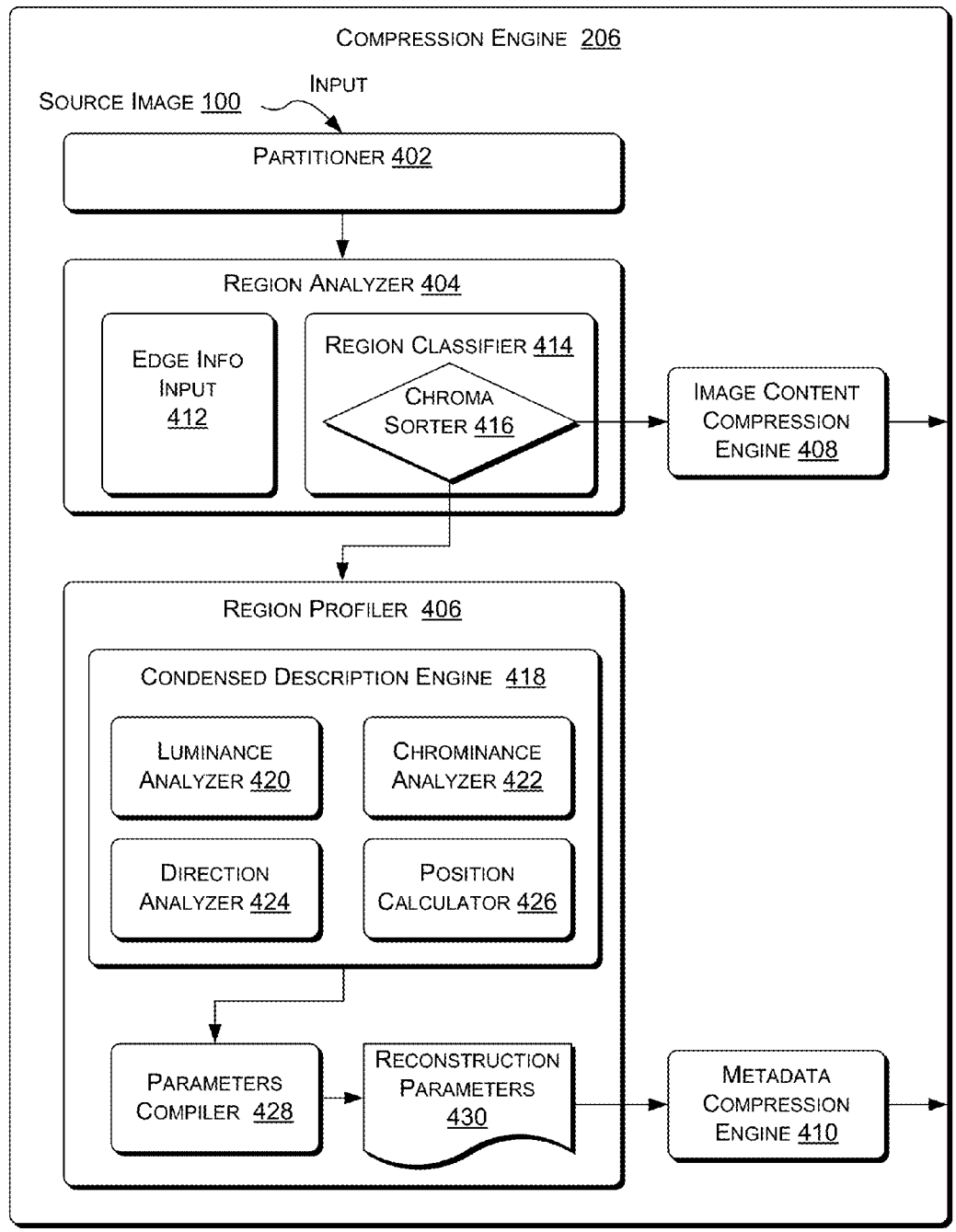
FIG. 4 is a block diagram of an exemplary compression engine compatible with parameter-assisted inpainting.

FIG. 4 shows the exemplary compression engine 206 of FIG. 2, which performs the encoding-side functions of FIG. 3, in greater detail. The illustrated implementation is only one example configuration, for descriptive purposes. Many other arrangements of the illustrated components or even different components constituting an exemplary compression engine 206 are possible within the scope of the subject matter. Such an exemplary compression engine 206 can be executed in hardware, software, or combinations of hardware, software, firmware, etc.

The exemplary compression engine 206 includes a partitioner 402 to divide the source image 100 into regions, e.g., blocks. The exemplary compression engine 206 also includes a region analyzer 404, region profiler 406, image content compression engine 408, and a metadata compression engine 410.

The region analyzer 404 may include an edge information input 412 and a region classifier 414 that includes a chroma (color) sorter 416.

The region profiler 406 may include a condensed description engine 418 that further includes a luminance analyzer 420, a chrominance analyzer 422, a directionality analyzer 424, and a position calculator 426 to log the position of the region within the image. The region profiler 406 may also include a parameters compiler 428 and a buffer for the reconstruction parameters 430.

These components of the compression engine 206 just introduced will be discussed in greater detail below, after introducing components of the decompression engine 214, which now follows.

Figure 5:
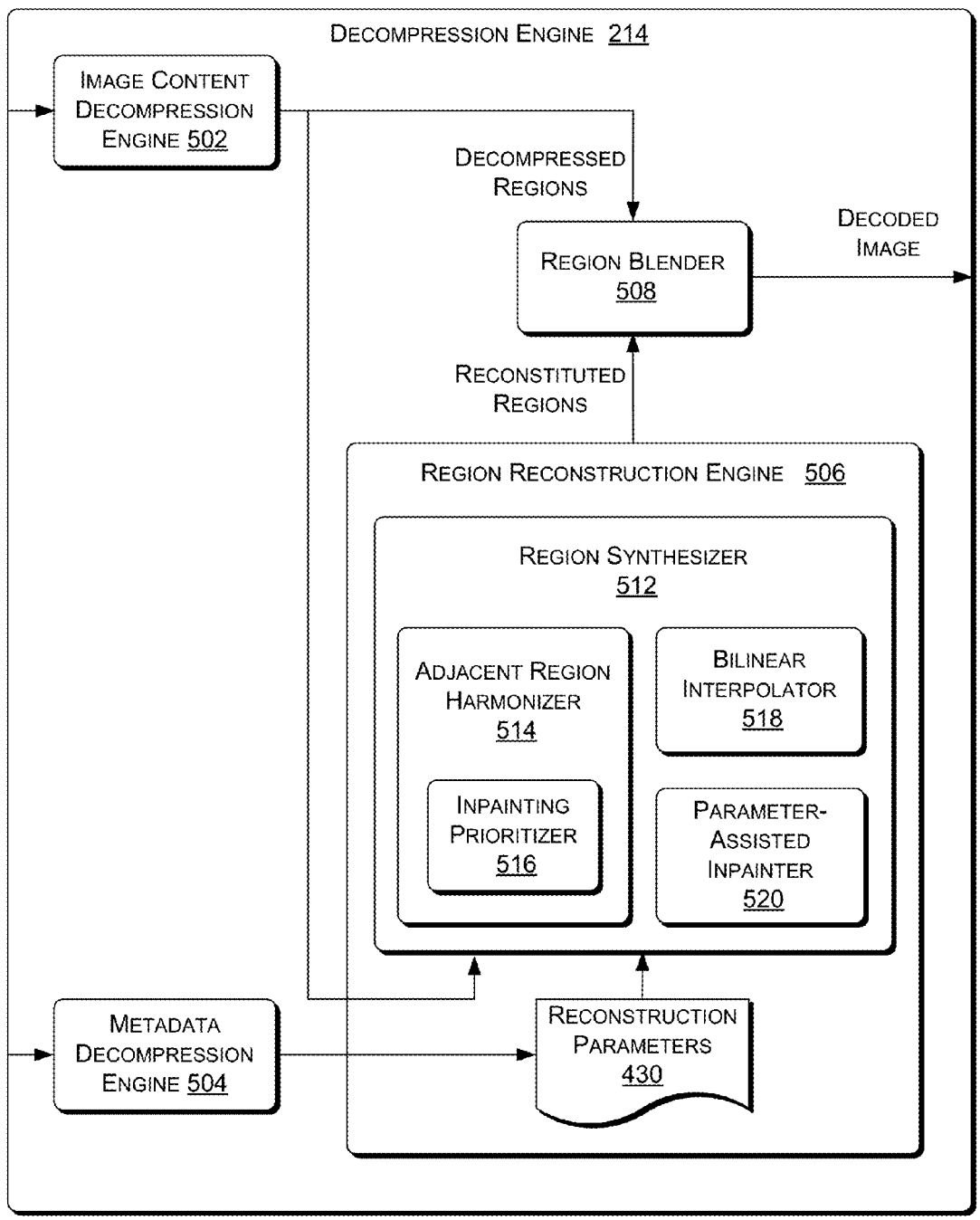
FIG. 5 is a block diagram of an exemplary decompression engine using parameter-assisted inpainting.

FIG. 5 shows the exemplary decompression engine 214 of FIG. 2, which performs the decoding-side functions of FIG. 3, in greater detail. The illustrated implementation is only one example configuration, for descriptive purposes. Many other arrangements of the illustrated components or even different components constituting an exemplary decompression engine 214 are possible within the scope of the subject matter. Such an exemplary decompression engine 214 can be executed in hardware, software, or combinations of hardware, software, firmware, etc. It should be noted that the exemplary decompression engine 214 performs two different types of decompression, decompression of image content for the compressed regions of the image and decompression of the descriptive parameters metadata for the summarized regions of the image.

The decompression engine 214 includes an image content decompression engine 502, a metadata decompression engine 504, a region reconstruction engine 506, and a region blender 508. The region reconstruction engine 506 performs the region synthesis (312 in FIG. 3) using the decompressed reconstruction parameters 430. In the region reconstruction engine 506, the reconstruction parameters 430 are fed to a region synthesizer 512, which in turn may include an adjacent region harmonizer 514, an inpainting prioritizer 516, a bilinear interpolator 518, and a parameter-assisted inpainter 520.

The operation of the compression engine 206 of FIG. 4 and the decompression engine 214 of FIG. 5, will now be described.

General Operation of the Exemplary Engines

In general, image inpainting (also known as image completion) is one promising approach in texture synthesis that can be applied by the exemplary decompression engine 214. Inpainting can provide further reduction of visual redundancy above the reduction achieved by current transform-based coding schemata, exemplified by the success of applying image inpainting technologies in error concealment. The term "inpainting" usually means a process of restoring missing data in a designated region of an image in a visually plausible manner. Current inpainting techniques can recover homogenous regions in a natural manner as well as certain kinds of structural regions or their features.

Generally, image inpainting is capable of recovering flat texture regions like sky and flat object surfaces in photos. Since various complicated light sources often exist in natural settings, however, the texture of sky and flat object surfaces is usually not homogenous and contains some variance in luminance and/or chrominance. When this is so, the reconstruction by image inpainting is far from satisfactory as the restored texture loses some important characteristics, such as asymmetrical density, gradual change in brightness, and ordinal variation in chrominance. In conventional applications, this problem is difficult to solve because the regions to be recovered by image inpainting are totally unknown—the inpainter makes a best guess.

The exemplary decompression engine 214, however, applies image synthesis, such as inpainting, for perceptually accurate and/or satisfactory image reconstruction because the regions to be recovered are previously known by the compression engine 206 at the encoder side and summarized by the extracted parameters. Therefore, the parameter-assisted inpainter 520 aims at deeper exploitation of the visual redundancy inherent in smooth image regions than conventional techniques can, while preserving unique visual features.

First, the partitioner 402 divides the input image 100 into regions or blocks. The block size in pixels may be 8×8, 16×16, 32×32, etc. Then, the region analyzer 404 makes an overall analysis of the image with respect to variance properties and edges. In one implementation, the region analyzer 404 includes the region classifier 414 and chroma sorter 416, which classify image blocks using edge information determined in advance and received at the edge information input 412. The region classifier 414 categorizes the blocks into different types, such as structure blocks, texture blocks, and smooth blocks. In some implementations, different strategies are applied for processing each different type of block.

The region profiler 406 processes and summarizes smooth blocks while the rest of the blocks (the unsmooth blocks) are processed by the image content compression engine 408, which applies a conventional compression, such as JPEG. Thus, the image content compression engine 408 skips the smooth blocks in the original image 100.

For the smooth blocks to be summarized instead of compressed, the region profiler 406 derives a condensed description associated with each of the blocks to be summarized. The condensed description engine 418 extracts the reconstruction parameters 430 in a block-by-block manner. That is, the parameters compiler 428 gathers the condensed description—the reconstruction parameters 430—per smooth block. These parameters are collected from the luminance analyzer 420, chrominance analyzer 422, direction analyzer 424, and the position calculator 426 (which tracks the position of each smooth block in the image). For the smooth blocks, the condensed description engine 418 analyzes their variances in luminance and chrominance and obtains several parameters on the direction and magnitude of each variance. With these reconstruction parameters 430 and content information from neighboring blocks that have already been decoded by the decompression engine 214, the parameter-assisted inpainter 520 can generate reconstituted smooth blocks at the decoder in a visually plausible manner even though the blocks contain some variances that do not exist in their neighboring blocks.

In one implementation, the reconstruction parameters 430 produced by the region profiler 406 are subjected to their own compression by the metadata compression engine 410. The metadata compression engine 410 may code or compress the reconstruction parameters 430 by common compression algorithms like JBIG and/or an arithmetic encoder.

In general, at the decompression engine 214, the encoded (compressed) image and assistant information, such as the reconstruction parameters 430, are decompressed and the skipped blocks are reconstructed. If the current block has been encoded by a conventional compression technique at the compression engine 206, then the image content is directly decompressed. But if the current block has been summarized at the encoder 204 for later synthesis at the decoder 212, then in one implementation the compressed reconstruction parameters 430 are decompressed and the summarized block is reconstructed by the parameter-assisted inpainter 520, using the bilinear interpolator 518 and the reconstruction parameters 430 associated with each smooth block. In this manner, the decompression engine 214 achieves a much higher compression ratio for the smooth regions compared to baseline conventional JPEG.

The parameter-assisted inpainter 520 allows the region reconstruction engine 506 to recreate blocks that were skipped at the encoder 204. Then, the region blender 508 integrates the recreated blocks with the coded blocks that have been decompressed, thus generating the entire original image 100.

Detailed Operation of the Exemplary Engines

The following section describes in greater detail: the region classifier 414 and how it classifies blocks; the region profiler 406, including which parameters are extracted from the skipped blocks; how the reconstruction parameters 430 are coded; and how the parameter-assisted inpainter 520 recovers or synthesizes the skipped blocks.

In one implementation, the variances with skipped blocks are assumed to be linear. This does not mean, however, that the exemplary engines (206 and 214) are limited only to the linear case. In fact, the exemplary engines can apply their operational principles to the general case, extracting even more parameters from the skipped blocks to cover non-linear cases.

At the region analyzer 404, the image 100 is divided into non-overlapped n×n blocks and the edge information input 412 may employ an edge detection technique to obtain edge information. In one implementation, the blocks containing edge pixels are treated as "structure." The chroma sorter 416 further sorts the other blocks into two types according to chroma variation, as calculated in Equation (1).

$$\overline{x_R} = \frac{\sum_{\forall i} \sum_{\forall j} x_{R,ij}}{i \times j}, \overline{x_G} = \frac{\sum_{\forall i} \sum_{\forall j} x_{G,ij}}{i \times j}, \overline{x_B} = \frac{\sum_{\forall i} \sum_{\forall j} x_{B,ij}}{i \times j} \quad (1)$$

$$\text{var} = \sum_{\forall i} \sum_{\forall j} [(x_{R,ij} - \overline{x_R})^2 + (x_{G,ij} - \overline{x_G})^2 + (x_{B,ij} - \overline{x_B})^2]$$

In Equation (1), i and j are the pixel indexes; R, G and B denote chroma of red, green and blue, respectively. If the variation exceeds a threshold, the block is sorted into a "texture" type; otherwise, it belongs to the "smooth" type. Thus, the region classifier 414 sorts the image's blocks into structure, texture, and smooth types. The following description focuses mainly on processing of the smooth type of block.

Parameters Representing Smooth Regions

Considering an n×n smooth block as the matrix below:

$$\begin{pmatrix} x_{11} & \cdots & x_{1n} \\ \vdots & \ddots & \vdots \\ x_{1n} & \cdots & x_{nn} \end{pmatrix}$$

then, in Equation (2):

$$x_{ij} = (x_{R,ij}, x_{G,ij}, x_{B,ij}), (1 \le i \le n, 1 \le j \le n) \quad (2)$$

$X_{i,j}$ represents the RGB value of the pixel that has a location (i, j) in the block, and its elements are assumed continuous due to the smooth nature of the block. Due to the continuity, in one implementation the region profiler 406 uses a linear model to simulate the block, as mentioned above. Specifically, the chroma sorter 416 determines the variation model of each chroma component in conjunction with the direction analyzer 424, in both horizontal and vertical directions. Taking the "R" (red) component as an example, the direction analyzer 424 obtains the change in horizontal direction as follows. First, a preprocessing step in the vertical direction is performed according to Equation (3):

$$x_{R,j} = \frac{\sum_{i=1}^{i=n} x_{R,ij}}{n}, j = 1, \ldots, n \qquad (3)$$

In one implementation, the direction analyzer 424 uses the linear model $f(x)=ax+b$ to fit the n points by the Least Square (LS) method. Estimated values for a and b are calculated as in Equation (4):

$$a = \frac{\sum_{j=1}^{j=n} \left(j - \frac{n+1}{2}\right)(x_{R,j} - \overline{x_R})}{\sum_{j=1}^{j=n} \left(j - \frac{n+1}{2}\right)^2} \qquad (4)$$

$$b = \overline{x_R} - \frac{n+1}{2}a$$

$$\overline{x_R} = \frac{\sum_{j=1}^{j=n} x_{R,j}}{n},$$

Then, a is the desired parameter and it is denoted as $r_x$. Similarly, the direction analyzer 424 obtains the other five directional parameters $r_y, g_x, g_y, b_x, b_y$, for red, green, and blue.

For coding, the region profiler 406 first quantizes the directional parameters. In one implementation, there are 15 quantization levels, that is, $-7, \ldots, 0, \ldots, 7$, which correspond to the actual parameter as follows in Equation (5) taking $r_x$ as an illustrative example:

$$r_x = \begin{cases} -7, & r_x \leq -0.9375 \\ [8r_x], & -0.9375 < r_x < 0.9375 \\ 7, & r_x \geq 0.9375 \end{cases} \qquad (5)$$

This indicates that the largest slope that can be differentiated is less than 1, which indicates a quick change, considering the smoothness of the smooth region. After quantization, each parameter can be coded into four bits. The metadata compression engine 410 can code this additional information by known compression algorithms such as an arithmetic encoder. Also, a binary map from the position calculator 426 can be coded by JBIG, denoting the positions of the skipped, smooth blocks. The remaining image blocks are compressed at the image content compression engine 408, e.g., by JPEG compression.

Image Reconstruction

In one implementation of the exemplary decompression engine 214, the inpainting prioritizer 516 decides the priority of reconstructing the skipped blocks according to the following two-rule schema. First, the block that has the highest number of neighboring blocks with original content, e.g., in a 4-block neighborhood, has the highest priority. Second, for blocks that have same number of neighbors with original content, the block that has the highest number of reconstructed (e.g., inpainted) neighbors has the highest priority. The priority can be used, e.g., as a weighting factor for blending borders between adjacent blocks, or for smoothing visual changes across blocks.

Synthesizing Blocks Via Bilinear Interpolation

In one implementation, when a block that has been summarized by descriptive reconstruction parameters 430 is to be reconstructed by the region synthesizer 512, contextual information is often available from neighboring blocks that have been compressed and decompressed conventionally by the image content compression engine 408, as mentioned.

There may be less to synthesize "from scratch" to approximate a block when neighboring blocks have the same or very similar visual characteristics as the block being synthesized. This is especially true of the border pixels between a block that is being synthesized and a "known" block that has decompressed original image content. It is unlikely for a sudden visual change to very often coincide with the block border because block size is arbitrarily selected to enable processing and does not coincide with the visual characteristics of the image. Accordingly, the more "original" decompressed blocks there are surrounding a block that is to be synthesized, the more information is available for reconstructing the block from some of the characteristics of the neighboring blocks instead of performing a relatively complete synthesis purely using only a few descriptive parameters.

Figure 6:
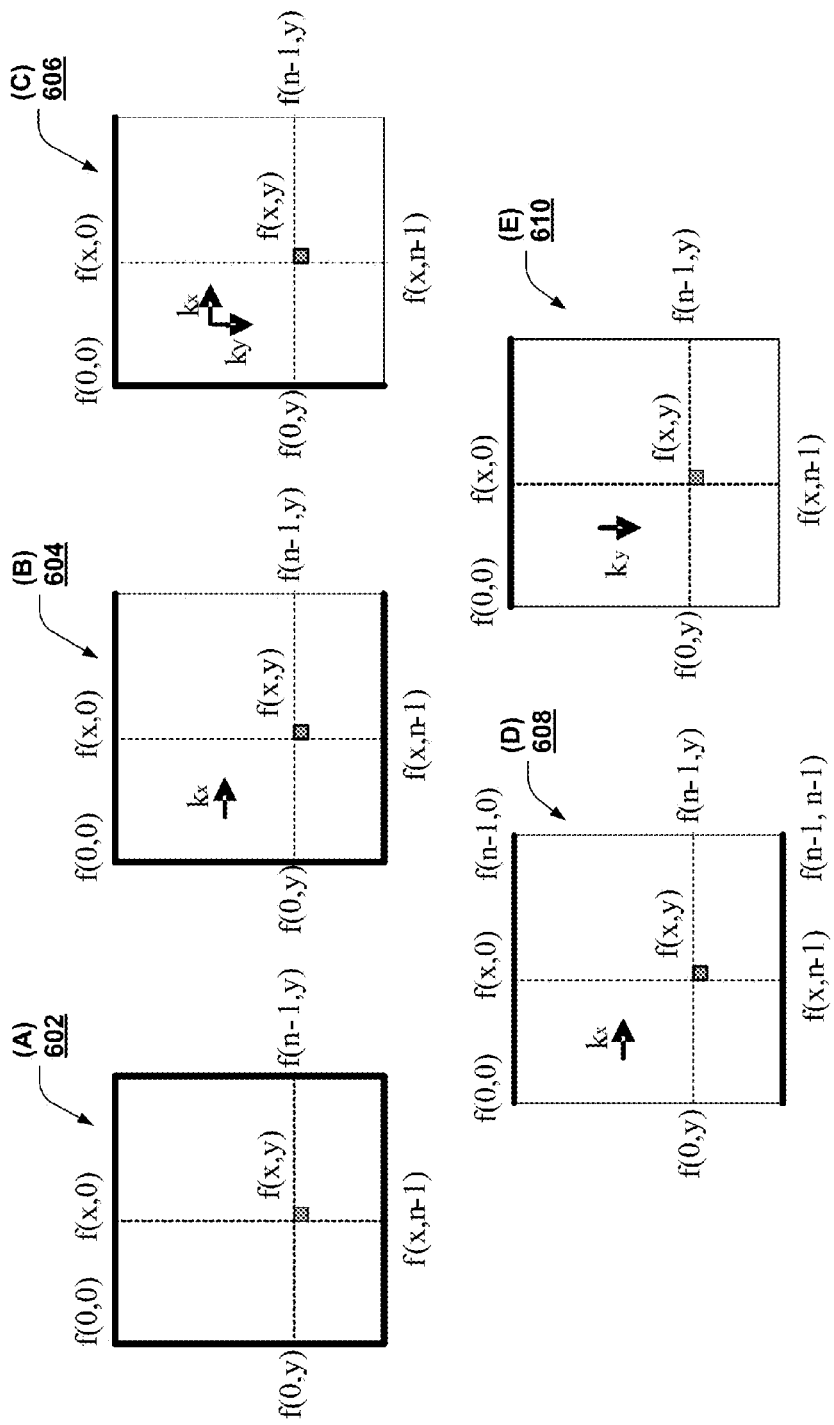
FIG. 6 is a diagram of exemplary border attribute interpolation in a block being synthesized.

As shown in FIG. 6, an "attainable" border (heavy lines) is defined as the border of a block that is to be synthesized when it is adjacent to a block of decompressed original image content—a "known" block. Thus, in the block being synthesized, the bilinear interpolator 518 of the region synthesizer 512 can interpolate an attribute of the border pixels of the block under construction with the average value of the corresponding attribute of the border pixels of known neighbor blocks (e.g., in an 8-block neighborhood).

When there are four borders attainable, the region synthesizer 512 can apply a function $f(x, y)$ to recover the inner pixels of the block being synthesized. The function $f(x, y)$ should be continuous in the entire block, including the borders, and yet should be able to reflect changes across the block. In one implementation, when there are four borders attainable 602—that is, the block being synthesized is "landlocked" by known blocks—a linear example of the $f(x, y)$ function that satisfies the above two conditions is shown in Equation set (5):

$$f(x, y) = k_1 f(x, 0) + k_2 f(x, n-1) + k_3 f(0, y) + k_4 f(n-1, y) \qquad (5)$$

$$k_1 = \frac{1}{2} - \frac{y}{2(n-1)}, k_2 = \frac{y}{2(n-1)},$$

$$k_3 = \frac{1}{2} - \frac{x}{2(n-1)}, k_4 = \frac{x}{2(n-1)}$$

When there are three borders attainable 604, the function $f(n-1, y)$ representing the single unknown border is not attainable from the neighboring known blocks, so the bilinear interpolator 518 uses the direction information from the reconstruction parameters 430, as in Equation set (6):

$$f(n-1, y) = f(0, y) + k_x(n-1), k_x = (r_x, g_x, b_x) \quad (6)$$

Then, $$f(x, y) = k_1 f(x, 0) + k_2 f(x, n-1) + k_3 f(0, y) + k_4 f(n-1, y)$$
$$k_1 f(x, 0) + k_2 f(x, n-1) + 0.5[f(0, y) + k_x x]$$

If there are two borders attainable, then in the first 606 of two cases, two borders—ƒ(x, n−1) and ƒ(n−1, y)—are not attainable, so the bilinear interpolator 518 uses the direction information in the reconstruction parameters 430 as in Equation set (7):

$$f(x, n-1) = f(x, 0) + k_y(n-1), k_y = (r_y, g_y, b_y) \quad (7)$$
$$f(n-1, y) = f(0, y) + k_x(n-1), k_x = (r_x, g_x, b_x)$$

then, $$f(x, y) = k_1 f(x, 0) + k_2 f(x, n-1) + k_3 f(0, y) + k_4 f(n-1, y)$$
$$0.5[f(x, 0) + k_y y + f(o, y) + k_x x]$$

In the second 608 of the two cases, when two borders—ƒ(x, 0) and ƒ(x, n−1)—are attainable while two borders ƒ(0, y) and ƒ(n−1, y) are unattainable, the bilinear interpolator 518 uses the direction information of the reconstruction parameters 430 as in Equation set (8):

$$f(0, y) = 2k_1 f(0, 0) + 2k_2 f(0, n-1) \quad (8)$$
$$f(n-1, y) = 2k_1 f(n-1, 0) + 2k_2 f(n-1, n-1)$$

then, $$f(x, y) = k_1 f(x, 0) + k_2 f(x, n-1) + k_3 f(0, y) + k_4 f(n-1, y)$$
$$= k_1 f(x, 0) + k_2 f(x, n-1) + 2k_3 [k_1 f(0, 0) + k_2 f(0, n-1)] +$$
$$2k_4 [k_1 f(n-1, 0) + k_2 f(n-1, n-1)]$$

When there is only one border attainable—i.e., where only the border ƒ(x, 0) is attainable—similarly, the bilinear interpolator 518 uses the direction information in the reconstruction parameters 430 as in Equation set (9):

$$f(0, y) = f(0, 0) + k_y y, \quad k_y = (r_y, g_y, b_y) \quad (9)$$
$$f(n-1, y) = f(n-1, 0) + k_y y$$
$$f(x, n-1) = f(x, 0) + k_y(n-1)$$

then, $$f(x, y) = k_1 f(x, 0) + k_2 f(x, n-1) + k_3 f(0, y) + k_4 f(n-1, y)$$
$$= 0.5 f(x, 0) + k_3 f + f(0, 0) + k_4 f(n-1, 0) + k_y y$$

Exemplary Methods

Figure 7:
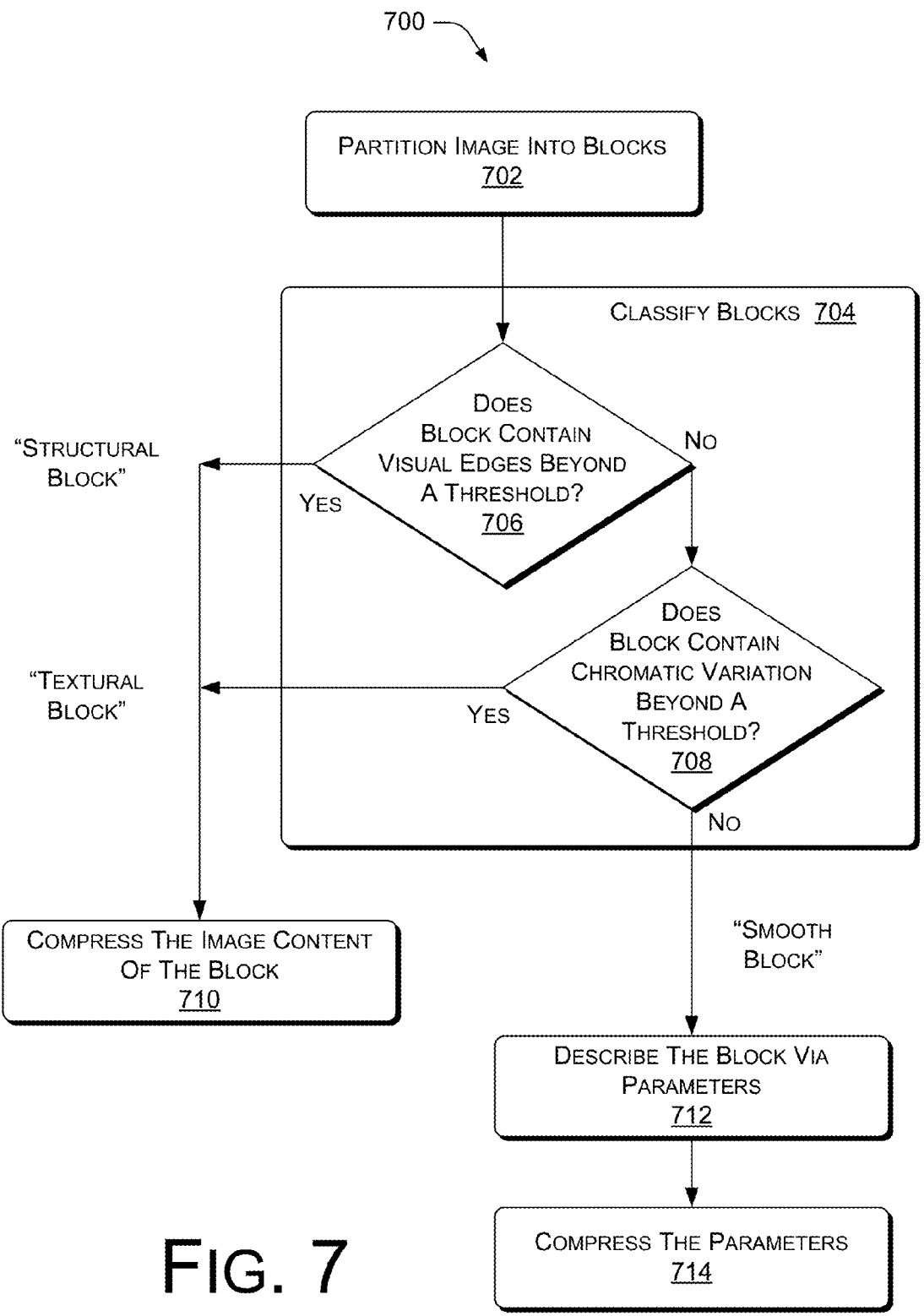
FIG. 7 is a flow diagram of an exemplary method of image coding.

FIG. 7 shows an exemplary method 700 of performing image compression, compatible with parameter-assisted inpainting during decoding. In the flow diagram, the operations are summarized in individual blocks. The exemplary method 700 may be performed by hardware, software, or combinations of hardware, software, firmware, etc., for example, by components of the exemplary compression engine 206.

At block 702, an image is partitioned into regions, such as blocks of pixels (e.g., 8×8, 16×16, 32×32 pixels). Each region or block possesses visual characteristics, determined by the interrelation of visual attributes between pixels. For example, pixel attributes of luminance and chrominance may portray a smooth image, a texture, or a structure, such as a visual edge, over the 2-dimensional area of the region or block.

At block 704, the regions or blocks are classified according to visual characteristics. Overall, in one implementation, the process of classifying aims to sort blocks into "smooth" and "unsmooth" blocks.

At block 706, each block is analyzed for the degree of visual edge content present in the block. If the number of visual edge pixels exceeds a threshold, the block is deemed a "structural block" and is classified as a candidate for image compression.

At block 708, if the block was not classified as a structural block at the visual edge test of block 706, then in one implementation the block is analyzed for the degree of chromatic variation present across the block (or the degree of variation in luminance, in other implementations). If the chromatic variance exceeds a threshold, the block is deemed a "textural block" and is classified as a candidate for image compression in the same manner as the structural blocks.

At block 710, the structural blocks and the textural blocks from the two preceding test processes at blocks 706 and 708 are compressed. That is, the image content of these "unsmooth" blocks is compressed, e.g., by conventional compression techniques, such as JPEG.

At block 712, by process of elimination, the blocks that were not classified as structural blocks by the visual edge test at block 706 and not classified as textural blocks by the chromatic variance test at block 708 are classified as "smooth" blocks. Informally, this means that the visual attributes of the block do not present a threshold degree of visual edge content nor a threshold degree of perceived texture. In some implementations, however, the textural blocks are grouped with the smooth blocks for the following process of describing the block by parameters instead of subjecting the block to conventional compression. In the illustrated exemplary method 700, however, only the smooth blocks are summarized via parameters.

At block 712, each smooth block is described by parameters of small data size relative to the data size of the image content of the block. This yields a very high "compression ratio" for the overall image, since the image content of these smooth blocks is skipped at the compression step at block 710. In one implementation, the parameters aim to capture the variances in luminance and chrominance that are unique to the block, especially when these variances exist as easily parameterized trends. The parameters may also include directional information for reconstructing the variances or trends across the block, as well as the position of the block in the image. In one implementation, the parameters may also include overall map information showing the positions of the skipped, smooth blocks across the entire image.

At block 714, in one implementation, the parameters metadata are themselves compressed. This metadata compression does not use the image compression technique employed at block 710, but rather uses a string compressor, JBIG, and/or arithmetic coding, etc.

Figure 8:
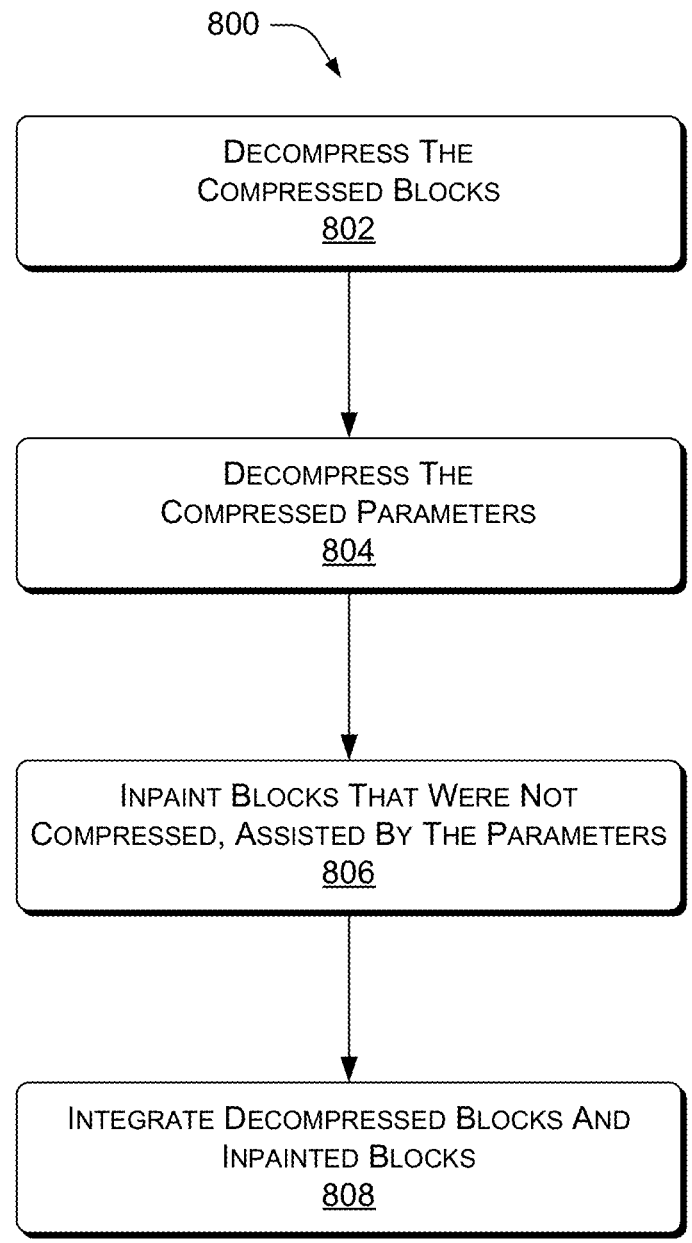
FIG. 8 is a flow diagram of an exemplary method of image decoding.

FIG. 8 shows an exemplary method 800 of image decompression based on parameter-assisted inpainting. In the flow diagram, the operations are summarized in individual blocks.

The exemplary method 800 may be performed by hardware, software, or combinations of hardware, software, firmware, etc., for example, by components of the exemplary decompression engine 214.

At block 802, the compressed image content of the compressed blocks is decompressed by a decompression technique complementary to the image content compression technique employed at the encoder.

At block 804, the compressed parameters associated with each of the uncompressed smooth blocks are decompressed by a technique complementary to that used at the encoder.

At block 806, the blocks that were not compressed—the "skipped," smooth blocks—are reconstructed by an inpainting technique, assisted by the decompressed parameters. The inpainting creates image content for each block based on attributes of those neighboring blocks (if any) that have "original" image content decompressed from JPEG (or other image content compression technique). If there are no neighboring blocks that have original image content, then the inpainting may create image content based on neighboring blocks that have already been inpainted during the decoding process. In one implementation, an inpainting priority is established with blocks being assigned the highest priority that have the most neighboring blocks possessing original image content. When two blocks have the same number of such neighboring blocks, then the highest inpainting priority goes to that block that has the most neighboring blocks that have already been inpainted. In one implementation, linear functions are applied to interpolate attributes of border pixels with, e.g., the average value of the border pixels of a neighboring block on the same border. The linear function creates content across the block with continuity, while also reflecting visual changes unique to the current block being inpainted.

Importantly, the exemplary inpainting for each block is steered by the decompressed parameters in order to synthesize and/or approximate the variations in luminance and chrominance that the original smooth block had, with the trends in these variances positioned in a like manner as in the original block.

At block 808, the decompressed blocks and the inpainted blocks are integrated or blended. In one implementation this means that each block is simply placed properly in the image according to position parameters drawn from the original image at the encoder or according to a placement map created at the encoder. In another implementation, the blending process includes a process of harmonizing borders between adjacent blocks to prevent an appearance of blockiness, using a linear (or bilinear) interpolation technique as described above for the inpainting at block 806.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. An image compression system, comprising:
    at least one processor;
    a compression engine executable by the at least one processor, the compression engine comprising:
        a partitioner to divide an image into regions;
        a region analyzer to classify the regions as smooth or unsmooth based at least in part on visual edge and chrominance characteristics of the regions;
        a region profiler to derive parameters for inpainting a reconstruction of the smooth regions at a decoder; and
        a content compressor for compressing image content of the unsmooth region.

2. The image compression system as recited in claim 1, wherein the region analyzer is programmed to classify one of the regions as smooth when a number of visual edge pixels does not exceed a threshold and when a variation in chrominance among pixels does not exceed a threshold.

3. The image compression system as recited in claim 1, wherein the region profiler is programmed to derive parameters for a smooth block that includes block position, variation in luminance, variation in chrominance, direction of variation in luminance, or direction of variation in chrominance.

4. The image compression system as recited in claim 1, further comprising:
    a decompression engine, executable by the at least one processor, that includes an image content decompressor for decompressing the image content of the unsmooth regions; and
    a region reconstruction engine, executable by the at least one processor, for reconstituting the smooth regions via inpainting.

5. The image compression system as recited in claim 4, further comprising a region blender, executable by the at least one processor, to produce a decoded version of the image by integrating the smooth regions and the unsmooth regions.

6. The image compression system as recited 4, further comprising a parameter-guided inpainter, executable by the at least one processor, to reconstruct each smooth region including visual variations in each smooth region summarized by the parameters associated with the smooth region.

7. The image compression system as recited in claim 4, wherein the region reconstruction engine includes an inpainting prioritizer and a bilinear interpolator to derive border pixels of at least one of the smooth regions from border pixels of one or more neighboring unsmooth regions that have decompressed image content.

8. The image compression system as recited in claim 7, wherein the inpainting prioritizer establishes an inpainting priority of the smooth regions.

9. A method comprising:
    dividing, by one or more computing devices, an image into regions;
    classifying, by the one or more computing devices, the regions as smooth or unsmooth based at least in part on visual edge and chrominance characteristics of the regions;
    deriving parameters for inpainting a reconstruction of smooth regions; and
    compressing image content of unsmooth regions.

10. The method of claim 9, wherein at least one of the regions is classified as smooth based at least in part on a number of visual edge pixels not exceeding a threshold.

11. The method of claim 9, wherein at least one of the regions is classified as smooth based at least in part on a variation in chrominance among pixels not exceeding a threshold.

12. The method of claim 9, further comprising, deriving, by the one or more computing devices, one or more parameters for a smooth block that include block position, variation in luminance, variation in chrominance, direction of variation in luminance, or direction of variation in chrominance.

13. The method of claim 9, further comprising:
    decompressing, by the one or more computing devices, the image content of unsmooth regions; and producing, by the one or more computing devices, a decoded version of the image by integrating smooth regions and unsmooth regions.

14. The method of claim 13, further comprising deriving, by the one or more computing devices, border pixels of at least one smooth region from border pixels of one or more neighboring unsmooth regions that have decompressed image content.

15. The method of claim 14, further comprising reconstructing at least one smooth region including visual variations in the at least one smooth region summarized by the parameters associated with the at least one smooth region.

16. A method comprising:
partitioning an image into blocks;
compressing image content of at least some of the blocks;
determining whether a block will be skipped by the compressing image content based on a visual smoothness of the block;
determining parameters for reconstructing skipped blocks; and
inpainting skipped blocks based at least in part on the parameters.

17. The method of claim 16, wherein the visual smoothness of the block is based at least in part on a position of the block, variation in luminance, variation in chrominance, direction of variation in luminance, or direction of variation in chrominance.

18. The method of claim 16, wherein the determining parameters for skipped blocks establishes an inpainting priority for inpainting skipped blocks.

19. The method of claim 18, wherein the determining the parameters for skipped blocks comprise at least one of:
determining, by the one or more computing devices, a first block having a highest number of neighboring blocks with original content; or
determining, by the one or more computing devices, a second block having a same number of neighboring blocks with original content as another one or more blocks, the second block having a highest number of reconstructed neighboring blocks.

20. The method of claim 19, wherein the first block has a highest inpainting priority and the second block has a next highest inpainting priority.

* * * * *